C. G. CURTIS.
TAPS FOR CUTTING SCREW-THREADS.

No. 176,840. Patented May 2, 1876.

Witnesses:

Inventor:
Charles G. Curtis
By Fitch & Fitch
Attys.

UNITED STATES PATENT OFFICE.

CHARLES G. CURTIS, OF BRIDGEPORT, CONNECTICUT.

IMPROVEMENT IN TAPS FOR CUTTING SCREW-THREADS.

Specification forming part of Letters Patent No. 176,840, dated May 2, 1876; application filed April 5, 1876.

*To all whom it may concern:*

Be it known that I, CHARLES G. CURTIS, of Bridgeport, county of Fairfield, State of Connecticut, have invented an Improved Device for Securing Cutter-Tools upon their Stocks, of which the following is a full, clear, and exact description, reference being had to the accompanying drawings, forming part of this specification:

My invention relates to the securing of the cutters of taps and reamers, and such similar tools, upon their stocks; and consists in a dovetail formed in each end of the cutter, and corresponding dovetails respectively in a plate at the lower end of the stock, and a cap arranged above the cutters, either or both the said plate and cap being removable and adjustable to secure the cutters in place on the stock, as hereinafter particularly set forth.

Figure 1:
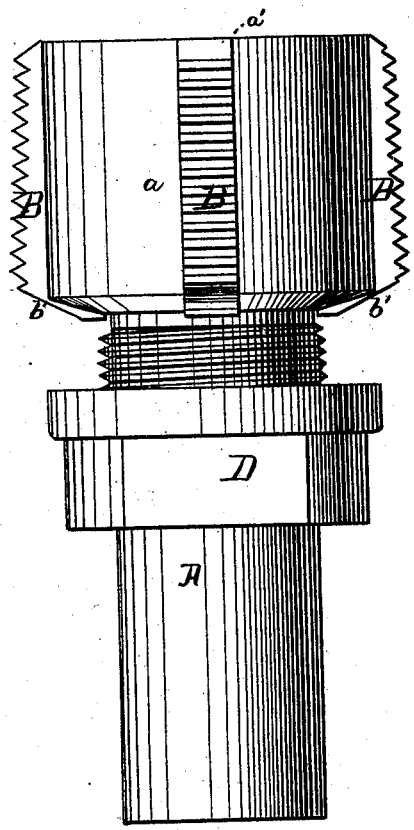
Figure 2:
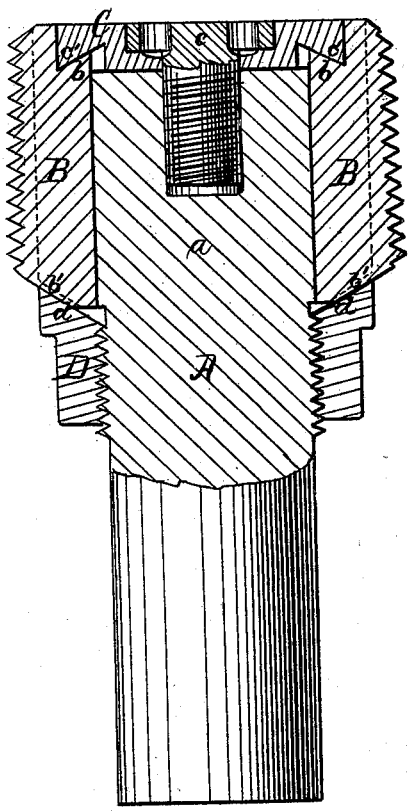

Figure 1 is an elevation of a tap and reamer embodying my invention. Fig. 2 is a vertical central sectional view of the same.

A is the stock, made in the usual form, and with the head $a$, in which are formed the channels $a'$, for the reception of the cutters. B are the cutters, which are made with the dovetail $b$ at the lower end thereof, as shown, and also with the bevel or dovetail $b'$ at the upper end. The form of the cutters is plainly shown in Fig. 2. C is a disk or plate, which, by means of a tap-screw, $c$, I secure upon the lower end of the stock A, the rim of said plate being within the head of the stock, and extending beyond the line of the cutters, and being formed with a circumferential beveled or dovetailed channel, $c'$, into which the dovetails $b$ of the cutters are adjusted and fitted, and to which dovetails $b$ the said channel $c'$ is adapted and conformed. Above the cutters on the stock, I place a cap, D, turning on a thread, and thus capable of being forced down upon the cutters. Upon the under side of this cap D is formed a beveled or dovetailed circumferential channel or groove, $d$, which is adapted and conformed to the dovetail $b'$ on the upper ends of the cutters, so that when the said cap D is turned down into place, as shown in Fig. 2, the groove $d$ will grasp the dovetailed ends $b'$ of the cutters, and clamp them tightly into place upon the stock, the dovetails $b$ upon the lower ends of the cutters being caught into the channel $c'$ in the plate C.

I prefer to construct my invention as I have above described, for the reason that it is more convenient, and may be the more readily adjusted and operated; but the cap D may be made in the same piece as the stock, the dovetailed channel $d$ being turned out to receive the upper ends $b'$ of the cutters, while the plate C, carrying the channel $c'$, may be adapted by means of a tap-screw, $c$, or in any other convenient manner, to clamp the cutters into place upon the stock, or the plate C may be made a part of the stock, the dovetails $c'$ therein being formed to receive the lower ends $b$ of the cutters, while the cap D formed, arranged, and operating as already shown, will grasp the ends $b'$ of the cutters, and hold them securely in place.

For convenience in fabrication, and that the device may be readily operated, however, I prefer, as I have stated, to form the plate C and cap D in pieces respectively separate from the stock, and arranged to operate together, as shown.

It is evident that, by means of my described device, the cutters of all tools similar to that of a tap and reamer, herein shown, may be secured upon their stocks.

What I claim as my invention, and desire to secure by Letters Patent, is—

As a device for securing the cutters upon the stocks of taps and reamers, and similar tools, the plate C having dovetail channel $c'$, and cap D having similar channel $d$, either the plate or cap, or both, being movable on or detachable from the stock A, together with the cutters B having dovetails $b$ and $b'$, respectively, on their lower and upper ends, all arranged to operate as described.

CHARLES G. CURTIS.

Witnesses:
CURTIS THOMPSON,
V. R. C. GIDDINGS.